US010599992B1

(12) United States Patent
Cohen et al.

(10) Patent No.: US 10,599,992 B1
(45) Date of Patent: Mar. 24, 2020

(54) PREDICTING RELIABILITY OF PRODUCT AND PART COMBINATIONS USING MACHINE LEARNING BASED ON SHARED MODEL

(71) Applicant: EMC Corporation, Hopkinton, MA (US)

(72) Inventors: Raphael Cohen, Beer-Sheva (IL); David M. Dionisio, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1231 days.

(21) Appl. No.: 14/850,308

(22) Filed: Sep. 10, 2015

(51) Int. Cl.
*G06N 5/04* (2006.01)
*G06N 20/00* (2019.01)
*G06N 5/02* (2006.01)

(52) U.S. Cl.
CPC .............. *G06N 20/00* (2019.01); *G06N 5/02* (2013.01); *G06N 5/04* (2013.01)

(58) Field of Classification Search
CPC ........................................................ G06N 5/04
USPC ........................................................ 706/46
See application file for complete search history.

(56) References Cited

U.S. PATENT DOCUMENTS

| 7,050,935 | B1 | 5/2006 | Draber |  |
|---|---|---|---|---|
| 7,672,921 | B1 * | 3/2010 | Clay | G06Q 10/06 706/45 |
| 7,831,396 | B2 * | 11/2010 | Voigtlaender | G05B 19/4065 340/653 |
| 8,467,894 | B2 * | 6/2013 | Santos | G06Q 10/087 700/100 |
| 2006/0271346 | A1 |  11/2006 | Lonn et al. |  |

(Continued)

FOREIGN PATENT DOCUMENTS

CN 102799946 A 11/2012
CN 102982208 A 3/2013

OTHER PUBLICATIONS

Li et al ("Big Data in product lifecycle management" May 2015) (Year: 2015).*
Of Lee et al ("Prognostics and health management design for rotarymachinery systems—Reviews, methodology and applications" (Year: 2013).*

(Continued)

*Primary Examiner* — Lut Wong
(74) *Attorney, Agent, or Firm* — Ryan, Mason & Lewis, LLP

(57) ABSTRACT

An apparatus comprises a processing platform configured to implement a machine learning system for automated generation of predicted reliability measures and associated early warning indicators for product and part combinations. The machine learning system comprises a data aggregation module configured to extract product and part data from a big data repository, and a reliability predictor configured to generate predicted reliability measures for respective ones of the product and part combinations utilizing a shared model that is determined based at least in part on the extracted product and part data. The machine learning system processes the predicted reliability measures to generate early warning indicators relating to particular ones of the product and part combinations having predicted reliability measures that fail to meet one or more specified criteria. The machine learning system illustratively provides the early warning indicators to a visualization interface so as to facilitate user adjustment of a product line.

20 Claims, 6 Drawing Sheets

(56) References Cited

U.S. PATENT DOCUMENTS

| | | |
|---|---|---|
| 2007/0255442 A1 | 11/2007 | Nakamura et al. |
| 2010/0169165 A1 | 7/2010 | Bateni et al. |
| 2012/0254710 A1 | 10/2012 | Flanagan et al. |
| 2014/0129000 A1 | 5/2014 | Block et al. |
| 2014/0372346 A1* | 12/2014 | Phillipps ................ G06N 20/00 706/12 |

OTHER PUBLICATIONS

S. Cheng et al., "A Fusion Prognostics Method for Remaining Useful Life Prediction of Electronic Products," 5th Annual IEEE Conference on Automation Science and Engineering (CASE), Aug. 2009, pp. 102-107, Bangalore, India.

J.A. Whittaker et al., "A Markov Chain Model for Predicting the Reliability of Multi-Build Software," Information and Software Technology, Sep. 2000, pp. 889-894, vol. 42.

M.G. Pecht et al., "Predicting the Reliability of Electronic Equipment," Proceedings of the IEEE, Jul. 1994, pp. 992-1004, vol. 82, No. 7.

U.S. Appl. No. 14/501,407 filed in the name of R. Cohen et al. on Sep. 30, 2014 and entitled "Automated Content Inference System for Unstructured Text Data."

U.S. Appl. No. 14/501,431 filed in the name of R. Cohen et al. on Sep. 30, 2014 and entitled "Cluster Labeling System for Documents Comprising Unstructured Text Data."

U.S. Appl. No. 14/670,810 filed in the name of R. Cohen et al. on Mar. 27, 29015 and entitled "Analysis and Visualization Tool with Combined Processing of Structured and Unstructured Service Event Data."

U.S. Appl. No. 14/670,976 filed in the name of R. Cohen et al. on Mar. 27, 29015 and entitled "Analysis and Visualization Tool Utilizing Mixture of Multiple Reliability Measures for Product and Part Combinations."

* cited by examiner

PREDICTING RELIABILITY OF PRODUCT AND PART COMBINATIONS USING MACHINE LEARNING BASED ON SHARED MODEL

FIELD

The field relates generally to information processing systems, and more particularly to techniques for product reliability analysis implemented in such systems.

BACKGROUND

Enterprises that manufacture, sell or support products typically maintain information processing systems for storing reliability data regarding their products. For example, failure rates for various products may be stored and tracked over time in order to facilitate implementation of various product improvements and to coordinate other related functions such as customer support and product recalls.

Conventional approaches to product reliability analysis in such systems suffer from a number of significant drawbacks. For example, many of these approaches are unable to handle the high-dimensionality data that can result from large numbers of possible product and part combinations. Other approaches fail to provide sufficient specificity of predicted outcomes in the case of relatively sparse data and are therefore unsuitable for use in early detection of reliability issues.

SUMMARY

Illustrative embodiments of the present invention provide machine learning systems for automated generation of predicted reliability measures and associated early warning indicators for product and part combinations. Such machine learning systems are advantageously configured in some embodiments to provide accurate and efficient analysis of high-dimensionality data including many thousands of different product and part combinations in big data repositories. Moreover, these machine learning systems can effectively provide early detection of reliability issues even for sparse data.

In one embodiment, an apparatus comprises a processing platform configured to implement a machine learning system for automated generation of reliability predictions and associated early warning indicators for respective product and part combinations. The machine learning system comprises a data aggregation module configured to extract product and part data from a big data repository, and a reliability predictor configured to generate predicted reliability measures for respective ones of the product and part combinations utilizing a shared model that is determined based at least in part on the extracted product and part data. The machine learning system processes the predicted reliability measures to generate early warning indicators relating to particular ones of the product and part combinations having predicted reliability measures that fail to meet one or more specified criteria. The shared model may be updated under the control of the machine learning system to take into account changes in the product and part data in the big data repository.

The machine learning system can be configured to provide the early warning indicators to a visualization interface so as to permit a user to adjust a product line to avoid potentially problematic product and part combinations.

The visualization interface is illustratively configured to generate a quadrant plot view visualization that displays the predicted reliability measures for respective product and part combinations as a function of number of parts in field for a designated time period, wherein each of a plurality of points plotted in the quadrant plot view visualization corresponds to a different one of the product and part combinations. Additional or alternative visualizations can be generated.

The machine learning system in some embodiments comprises back end and front end portions, with the back end portion comprising a big data analytics system implementing machine learning functionality of the machine learning system, including at least part of at least one of the above-noted data aggregation module and the reliability predictor, and the front end portion implementing at least part of the visualization interface.

By way of example, the big data analytics system of the back end portion may comprise a massively parallel processing (MPP) database having an associated library of scalable in-database analytics functions. Also by way of example, the front end portion may be configured to interact with the big data analytics system of the back end portion via a standardized database connectivity protocol, and illustratively comprises a web server implemented utilizing at least one virtual machine.

Illustrative embodiments can provide a number of significant advantages relative to the conventional arrangements described previously. For example, one or more of these embodiments avoid the above-noted problems with conventional approaches that cannot handle the high-dimensionality data resulting from large numbers of product and part combinations or cannot make accurate predictions of reliability issues from sparse data.

These and other illustrative embodiments described herein include, without limitation, apparatus, systems, methods and processor-readable storage media.

DETAILED DESCRIPTION

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
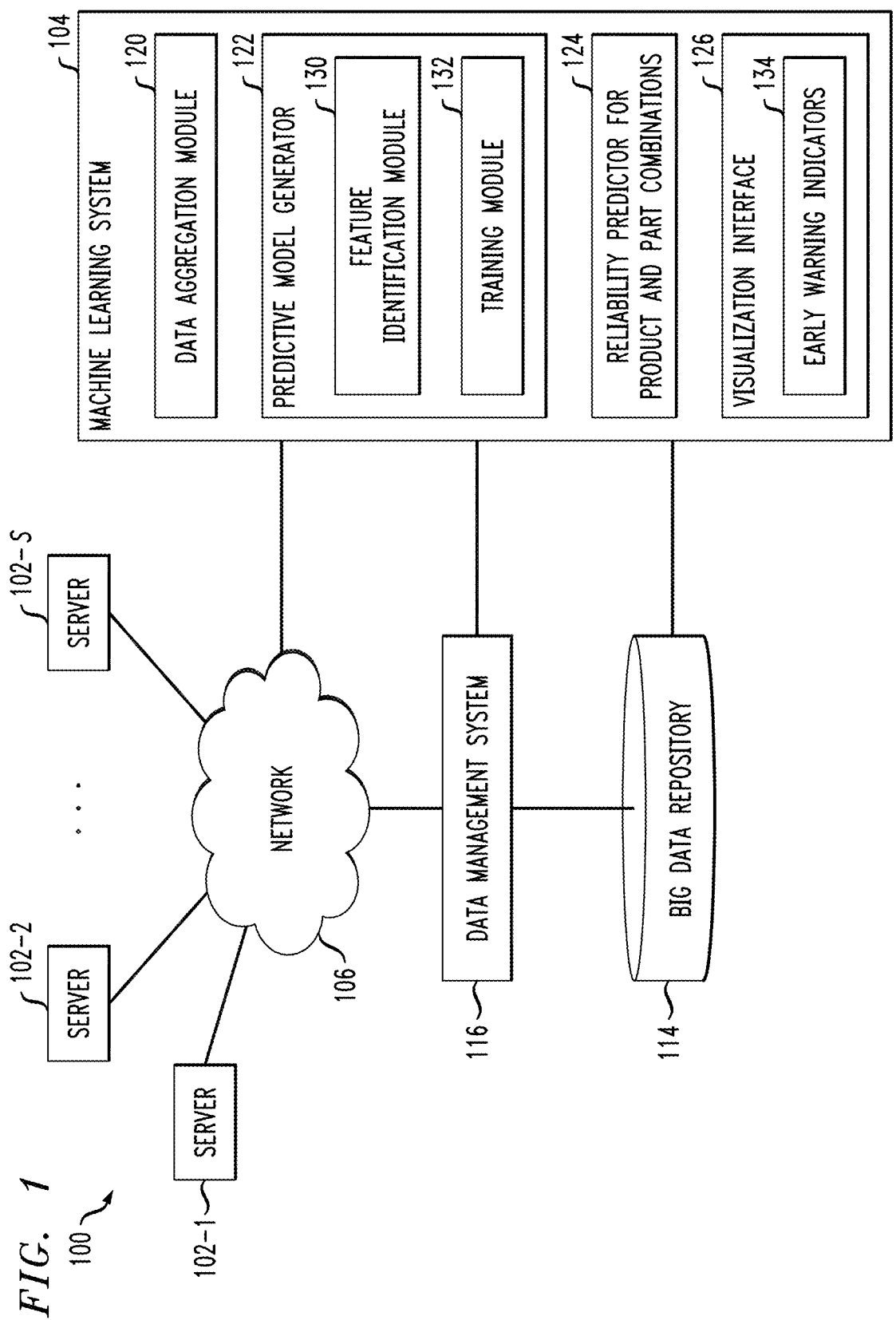
FIG. 1 is a block diagram of an information processing system that includes a machine learning system for automated generation of predicted reliability measures and associated early warning indicators for product and part combinations in an illustrative embodiment of the invention.

FIG. 1 shows an information processing system 100 configured in accordance with an illustrative embodiment of the present invention. The information processing system 100 is assumed to be built on at least one processing platform and in this embodiment illustratively comprises a plurality of servers 102-1, 102-2, . . . 102-S and a machine learning system 104, all of which are coupled to and communicate over a network 106. The machine learning system 104 is advantageously configured for automated generation of predicted reliability measures and associated early warning indicators for product and part combinations. The product and part combinations are illustratively based at least in part on product and part data provided by at least a subset of the servers 102, which may comprise servers located at respective different data centers or other facilities of a business or other enterprise.

The machine learning system 104 is coupled to a "big data" repository 114. The big data repository 114 in the present embodiment is assumed to store both product and part information. More particularly, data relating to a potentially large number of product and part combinations is stored in the big data repository 114. Such an arrangement may be viewed as an example of high-dimensionality data resulting from large numbers of possible product and part combinations. The high-dimensionality data can include, for example, data relating to hundreds or thousands of products each including up to tens of thousands of parts, all stored with relation to a significant number of distinct time periods, resulting in data tables with potentially billions of rows. Numerous other arrangements of billions of records can potentially result from collection of product and part data over time.

The terms "part" and "product" as used herein are intended to be broadly construed, and should not be viewed as being limited to any particular product or part types. For example, a product may comprise a storage product such as a storage array and a given part within that product may comprise a hard drive. Also, products and parts are not limited to hardware devices. For example, a part within a given product may comprise a particular software component within a larger software program.

It is to be appreciated that the big data repository 114 may comprise a combination of multiple separate databases, such as separate databases for different product lines. Such multiple databases may be co-located within a given data center or other facility or geographically distributed over multiple distinct facilities. Numerous other combinations of multiple databases each containing portions of product and part data can be used in implementing the big data repository 114.

By way of example, in an embodiment in which the system 100 is implemented by or on behalf of a customer-facing business such as a customer support organization, the data stored in the big data repository can comprise large amounts of information regarding part installation and failure. In the case of an organization providing hundreds of products with many different types of parts installed in these products, it is important to be able to predict reliability issues that may arise in particular ones of these combinations as quickly as possible. For example, a specific data storage device may cause early failure in a specific hard drive type due to the data access algorithm utilized by the specific data storage device. However, the same hard drive type may have a normal life span in other products.

The big data repository 114 illustratively comprises one or more storage disks, storage arrays, electronic memories or other types of memory, in any combination. Although shown as separate from the machine learning system 104 in FIG. 1, the big data repository 114 in other embodiments can be at least partially incorporated within the machine learning system 104, or within one or more other system components.

The data stored in the big data repository 114 need not be in any particular format or formats, but generally comprises reliability data relating to particular parts in association with particular products. The big data repository 114 in this embodiment is controlled at least in part by an associated data management system 116.

The machine learning system 104 can communicate directly with the big data repository 114 and the data management system 116, and additionally or alternatively can communicate with these system components via the network 106. The data management system 116 coordinates storage of data relating to product and part combinations in the big data repository 114, as well as provisioning of portions of that data to the machine learning system 104 as needed for processing. It is also possible for the machine learning system 104 to provide data directly to, and retrieve data directly from, the big data repository 114.

At least portions of the data provided for storage in the big data repository 114 can come from one or more of the servers 102 via the data management system 116. Also, visualizations or other related analysis information such as alarms or reports can be delivered by the machine learning system 104 to one or more of the servers 102 over network 106 for delivery to other portions of the system 100, such as one or more user devices coupled to the network 106 but not explicitly shown in FIG. 1.

As mentioned previously, conventional approaches are unable to adequately handle the high-dimensionality data typically resulting from large numbers of product and part combinations. Moreover, such conventional approaches often have considerable difficulty in accurately predicting reliability issues in specific product and part combinations, particularly in the case of sparse data.

The machine learning system 104 in the present embodiment is advantageously configured to overcome the above-noted drawbacks of conventional approaches. For example, the machine learning system 104 in this embodiment is configured to generate a shared model over multiple product and part combinations for accurate and efficient prediction of potential reliability issues that may arise in particular product and part combinations.

The shared model is referred to as "shared" in the illustrative embodiments in that it is shared over a community of multiple parts and possibly multiple products. Thus, the shared model characterizes product and part data that encompasses potentially very large numbers of product and part combinations.

By way of example, a given storage product such as a storage array may be configurable with a large number of different parts, such as different disk drives of various types from various vendors. A shared model in such an arrangement combines product and part data for all of the parts of a particular type used in each of one or more products.

The shared model in illustrative embodiments is a predictive model determined using linear regression or other types of regression, as will be described in more detail elsewhere herein. The example models used in these embodiments are therefore also referred to as predictive models or shared models.

The machine learning system 104 incorporates supervised machine learning functionality based on the shared model. For example, the machine learning functionality can be configured to achieve particular business objectives in terms of minimizing future replacement rate for particular product and part combinations. The model is trained using historical data aggregated from the big data repository 114 and as noted above is shared across multiple product and part combinations. As a result, for example, reliability predictions for newer product and part combinations can be significantly improved based on reliability behavior learned from other product and part combinations.

The machine learning system 104 more particularly comprises a data aggregation module 120, a predictive model generator 122, a reliability predictor 124, and a visualization interface 126. These elements of machine learning system 104 are assumed to be coupled to one another over a bus or other type of interconnection or communication medium although such coupling is not explicitly shown in the figure.

The data aggregation module 120 is configured to extract product and part data from the big data repository 114. For example, the product and part data extracted from the big data repository may be aggregated using predetermined data elements such as one or more of product name, part name, product instance identifier, time period, customer, number of parts in field, number of parts added, number of parts failed, total days to failure and total days in field. Numerous additional or alternative data elements in any combination may be used in performing data aggregation in the data aggregation module 120.

The predictive model generator 122 is configured to identify a plurality of features relevant to the extracted product and part data, to construct the shared model over multiple ones of the product and part combinations based on the identified features, and to train the shared model utilizing at least a portion of the extracted product and part data.

By way of example, the identified features may comprise at least a subset of current replacement rate, change in replacement rate, mean time between replacement and confidence interval of current replacement rate.

The current replacement rate in some embodiments comprises a current annual replacement rate (ARR) and the change in replacement rate comprises a smoothed change in replacement rate. The mean time between replacement is also referred to herein as mean time between part replacement (MTBPR).

The confidence interval of the current replacement rate is determined as a function of the current replacement rate and number of parts in field for a designated time period.

The ARR is an example of what is also referred to herein as failure rate or replacement rate.

The MTBPR is an example of what is also referred to herein as mean time to failure, mean time between failures or mean age at failure, where "age" in this context refers to the amount of time the part has been deployed in the field. In addition, the change in failure rate over time is also referred to herein as failure rate trend.

Although some embodiments utilize shared models based on ARR, MTBPR and other related features, additional or alternative features can be used in other embodiments, as determined at least in part utilizing aggregated product and part data from the big data repository 114.

The shared model in some embodiments herein is a linear regression model. It may comprise different models for different part types, such as one model for disk drives and another model for power supplies. Alternatively, the shared model may be generated for a particular product (e.g., a model for a VMAX® storage array) and encompass a plurality of different parts of a particular part type that are usable in the particular product. An example implementation of the shared model will be described in more detail below.

The identification of features and associated training of the shared model are implemented in respective modules 130 and 132 of the predictive model generator 122.

Although shown as an element of the machine learning system 104 in the present embodiment, the predictive model generator 122 in other embodiments can be implemented elsewhere within the system 100. For example, a model can be generated by another system component and supplied to the machine learning system 104. These and numerous other techniques can be used to determine a shared model based at least in part on product and part data extracted from the big data repository 114.

References herein to "determining a model" should be understood to encompass constructing or otherwise generating a model, selecting a model that was previously constructed or otherwise generated, as well as other techniques for obtaining a model appropriate for use with particular extracted product and part data.

The reliability predictor 124 is configured to generate predicted reliability measures for respective ones of the product and part combinations utilizing the shared model that is determined based at least in part on the extracted product and part data.

Examples of such predicted reliability measures include predicted ARR and predicted MTBPR. More particularly, in the context of the FIG. 4 visualization to be described in more detail below, the predicted reliability measures comprise predicted ARR at six months from the current time, also referred to as "predicted ARR+6 months" or simply "predicted ARR+6m" in the FIG. 4 visualization.

The machine learning system 104 processes the predicted reliability measures to generate early warning indicators 134 relating to particular ones of the product and part combinations having predicted reliability measures that fail to meet one or more specified criteria. The early warning indicators 134 are provided to the visualization interface 126 so as to permit a user to adjust a product line to avoid potentially problematic product and part combinations.

Although not explicitly illustrated in the figure, the shared model is assumed to be updated under the control of the machine learning system to take into account changes in the product and part data in the big data repository 114.

The visualization interface 126 is configured to generate at least one visualization as a function of the predicted reliability measures and associated early warning indicators 134 for different product and part combinations. Such visualizations are also referred to herein as user interfaces or user interface displays. Also, it is possible that a given user interface display can include multiple distinct visualizations of different types.

In the FIG. 1 embodiment, the visualization interface 126 more particularly includes functionality for generating a quadrant plot view visualization that displays the predicted reliability measures for respective product and part combinations as a function of number of parts in field for a designated time period. In such a quadrant plot view visualization, each of a plurality of the plotted points of the visualization illustratively corresponds to a different one of the product and part combinations. A more detailed example of a visualization of this type will be described below in conjunction with FIG. 4.

Other types of visualizations can be generated by the visualization interface 126 in addition to or in place of the quadrant plot view visualization.

These and other visualizations generated by the visualization interface 126 are configured to support drill down functionality into at least one of a particular product and a particular part of the generated visualization. Such functionality will be illustrated in the example quadrant plot view visualization of FIG. 4.

The visualization interface 126 is assumed to incorporate functionality for user selection of particular products or parts in conjunction with drill down functionality or other aspects of visualization generation.

By way of example, the visualization interface 126 can be configured to permit selection of one or more particular products from among a plurality of product and part combinations for which predicted reliability measures are presented in a given generated visualization. Responsive to selection of one or more particular products, the visualization is modified under the control of a corresponding view generator to show only those of the predicted reliability measures that relate to the selected product or products. Alternatively, the predicted reliability measures relating to the selected product or products may be highlighted in the visualization. Similar techniques can be used to highlight the early warning indicators within a given quadrant plot view visualization or other type of visualization.

In some embodiments, the visualization interface 126 is part of an analysis and visualization tool. Such a tool can incorporate other parts of the machine learning system 104. For example, it is possible to implement the machine learning system 104 within an analysis and visualization tool.

Although the data aggregation module 120 and reliability predictor 124 in the FIG. 1 embodiment are shown as being implemented within the machine learning system 104, in other embodiments one or more of these modules can be implemented at least in part externally to the machine learning system. For example, the data aggregation module 120 can be implemented at least in part in a related system, such as the data management system 116 associated with the big data repository 114.

It should be noted that different arrangements of one or more visualization interfaces can be used in other embodiments. For example, a wide variety of additional or alternative view generators can be implemented in the visualization interface 126 in other embodiments.

The visualization interface 126 is configured to provide an output display showing at least a subset of the various visualizations generated by associated view generators, as well as any additional or alternative visualizations. The output display illustratively comprises one of a plurality of user interface displays that are generated under the control of the visualization interface 126 and presented on a display screen of a user device not explicitly shown in the system 100 of FIG. 1. For example, such a user device may comprise a computer, mobile telephone or other type of processing device adapted for communication with the machine learning system 104 over the network 106.

The machine learning system 104 considerably facilitates identification of reliability issues in high-dimensionality data relating to large numbers of product and part combinations. For example, the generated visualizations allow analysts to quickly identify potentially problematic product and part combinations and to take appropriate remedial action, such as avoiding usage of such combinations in a product line.

It is to be appreciated that the particular arrangement of system components illustrated in FIG. 1 is exemplary only, and that numerous other arrangements of components may be used in other embodiments. For example, in other embodiments, functionality described herein as being associated with one or more of the data aggregation module 120, the predictive model generator 122, the reliability predictor 124 and the visualization interface 126 may be implemented at least in part using additional or alternative components of the system 100.

Also, the machine learning system 104 can in some embodiments incorporate automated functionality for detecting potential reliability issues and alerting appropriate service or administrative personnel or other users. For example, a detector can be incorporated into the machine learning system 104 and configured to alert a user automatically via an appropriate alerting mechanism based on one or more of the early warning indicators 134 without the user having to view a corresponding visualization.

Accordingly, some embodiments can be configured to operate in an automatic detecting and alerting mode of operation in addition to or in place of a visualization-based mode of operation such as that described previously.

The machine learning system 104, and possibly other related components of system 100 such as the big data repository 114, are assumed in the present embodiment to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, or a wide variety of other types of computer program products. The term "article of manufacture" as used herein is intended to be broadly construed, but should be understood to exclude transitory, propagating signals.

The one or more processing devices implementing the machine learning system 104, and possibly other components of system 100, may each further include a network interface that allows such components to communicate with one another over one or more networks. For example, a given such network interface illustratively comprises network interface circuitry that allows at least one of the modules 120, 122, 124 and 126 to communicate over a network with other components of the system 100 such as servers 102, big data repository 114 and data management system 116. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the machine learning system 104, and possibly other system components, may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 6 and 7.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations. Examples of other possible system embodiments will be described below in conjunction with FIGS. 3 and 5.

The operation of the information processing system 100 will now be further described with reference to the flow diagram of FIG. 2, which illustrates an exemplary process carried out by the system 100 in one embodiment. The process as shown includes steps 200 through 208. Steps 200 through 208 are assumed to be performed by the machine learning system 104, but one or more of these steps may be performed at least in part by or in conjunction with other system components in other embodiments. Moreover, automated reliability prediction functionality as disclosed herein should not be viewed as being limited in any way to this particular illustrative arrangement of process steps.

In step 200, product and part data are extracted from the big data repository 114. As noted above, such product and part data illustratively comprises high-dimensionality data relating to numerous distinct product and part combinations. For example, such data may comprise reliability data relating to respective product and part combinations for each of a plurality of products and each of a plurality of parts in each of the products. The big data repository 114 can store such product and part data for hundreds or thousands of products each containing tens of thousands of parts, over a significant number of time periods, potentially resulting in billions of table columns or other records.

The extraction of the product and part data in step 200 illustratively involves aggregating the data in data aggregation module 120 using predetermined data elements such as, for example, product name, part name, product instance identifier, time period, customer, number of parts in field, number of parts added, number of parts failed, total days to failure and total days in field. For example, in generating the visualization to be described in conjunction with FIG. 4, data relating to total numbers of particular different types of disk drives deployed in the field for a given time period is aggregated for each of a plurality of different products that include one or more of those disk drives.

In step 202, features relevant to the extracted product and part data are identified, a shared model is constructed over multiple product and part combinations based on the identified features, and the shared model is trained utilizing at least a portion of the extracted product and part data. The identified features in the present embodiment are assumed to comprise current replacement rate (e.g., current ARR), change in replacement rate (e.g., smoothed change in ARR), mean time between replacement (e.g., smoothed MTBPR) and confidence interval (CI) of current replacement rate, although additional or alternative features could be used in other embodiments, such as, for example, subsets of the above-noted identified features, or variants of one or more of these features.

As another example, classic Weibull parameters can also be used as additional or alternative features for the shared model, which is illustratively implemented as a linear regression model. In addition, although linear regression is used in some embodiments, other embodiments can utilize other types of regression.

In step 204, predicted reliability measures are generated for respective product and part combinations utilizing the shared model previously determined in step 202 based at least in part on the extracted product and part data.

Thus, for each of a plurality of different product and part combinations, a predicted reliability measure is generated. As indicated previously, examples of such predicted reliability measures include predicted ARR and predicted MTBPR.

Figure 4:
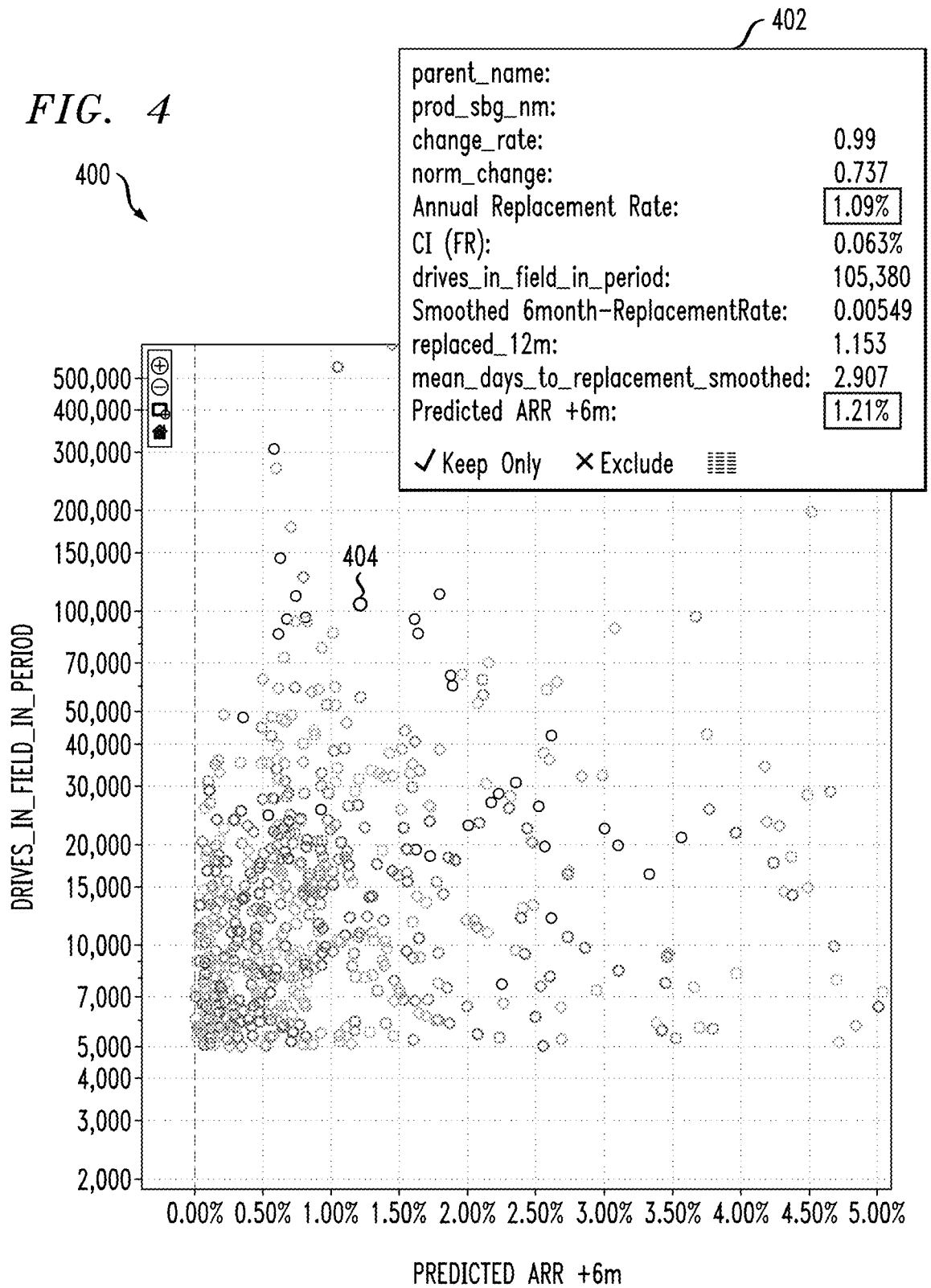
FIG. 4 shows an example of a user interface display generated by a machine learning system in an illustrative embodiment.

A more particular example of the predicted ARR is the above-noted ARR+6 months predicted reliability measure, which is utilized in the FIG. 4 visualization and described in more detail elsewhere herein.

In step 206, the predicted reliability measures are processed to generate early warning indicators relating to particular ones of the product and part combinations having predicted reliability measures that fail to meet one or more specified criteria.

In step 208, the early warning indicators are provided to the visualization interface 126 so as to permit a user to adjust a product line to avoid potentially problematic product and part combinations.

This illustratively involves generating in the visualization interface 126 a quadrant plot view visualization of the type shown in FIG. 4 that displays the predicted reliability measures for respective product and part combinations as a function of number of parts in field for a designated time period, with each of a plurality of points plotted in the quadrant plot view visualization corresponding to a different one of the product and part combinations. As noted above, the FIG. 4 visualization uses a predicted ARR+6 months reliability measure, but numerous other predicted reliability measures can be used.

Different colors or other display characteristics can be used to indicate that the predicted reliability measure for a particular product and part combination falls within a given quadrant or other portion of such a plot.

Accordingly, special highlighting can be used to indicate the particular product and part combinations that correspond to the early warning indicators 134, so as to make those product and part combinations readily apparent to a user.

The visualization may be manipulated via the visualization interface 126 of the machine learning system 104 to explore potentially problematic product and part combinations. For example, the interface may be configured to permit selection of one or more particular products from among a plurality of product and part combinations for which predicted reliability measures are presented in the generated visualization. Responsive to selection of one or more particular products, the visualization is modified to show only those of the predicted reliability measures that relate to the selected product or products.

Additionally or alternatively, automated functionality for detecting predicted reliability issues and alerting appropriate service or administrative personnel or other users can be provided. For example, as noted above, a detector can be incorporated into the machine learning system and configured to alert a user automatically via an appropriate alerting mechanism without the user having to view the corresponding visualization. Thus, early warning indicators for particular parts or products can be automatically generated and provided to users by the machine learning system 104 based on user-controlled filters or other types of detection and alerting arrangements.

After step 208, the process returns to step 200 as indicated. For example, steps 200 through 208 can be repeated periodically or as needed to process additional data relating to product and part combinations from the big data repository 114.

This portion of the process illustratively involves updating the shared model to take into account changes in the product and part data in the big data repository 114. Such model updates are assumed to be periodic but can additionally or alternatively be performed responsive to other detected conditions.

Figure 2:
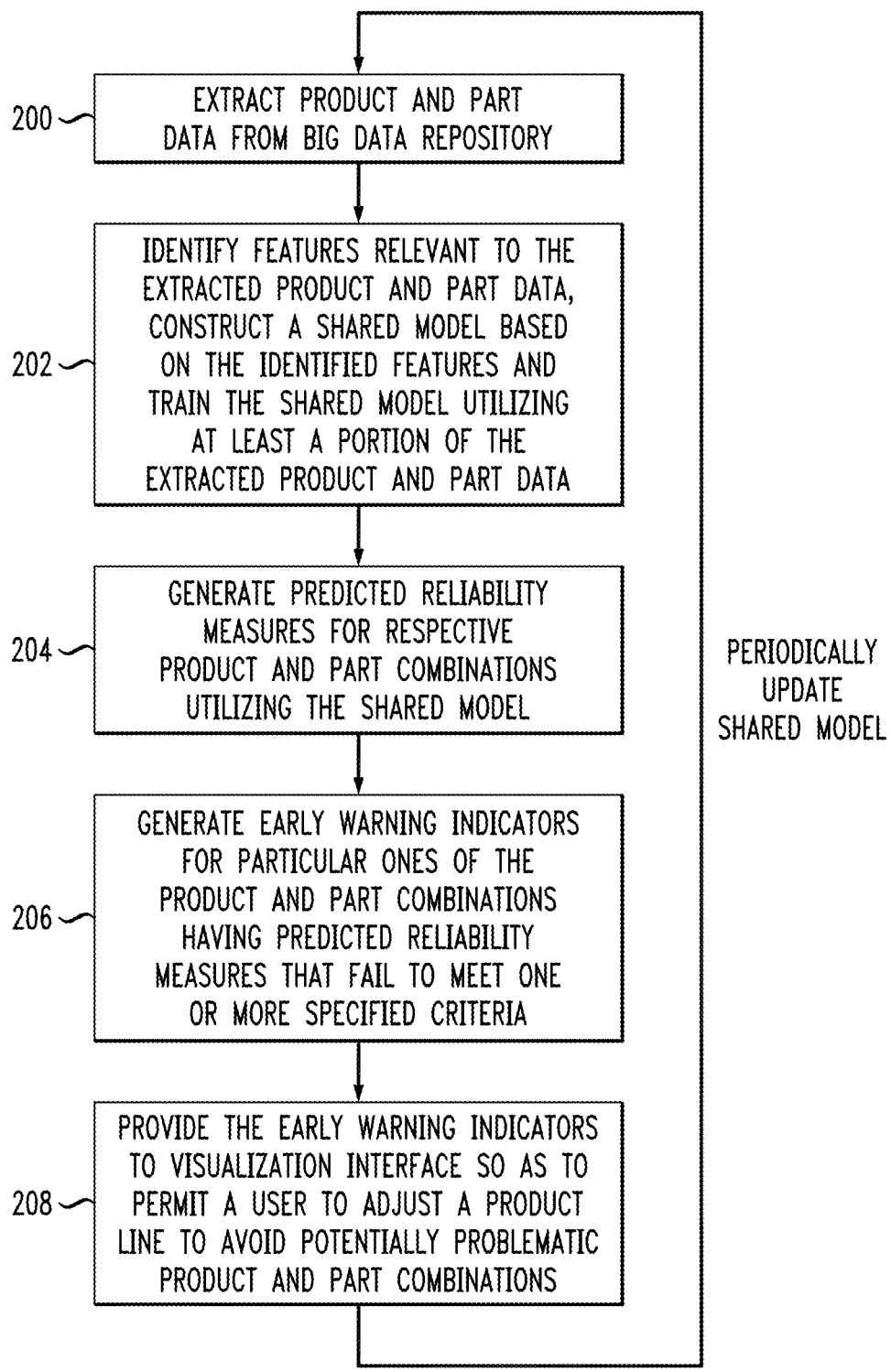
FIG. 2 is a flow diagram of an exemplary process implemented in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing a machine learning system or portions thereof. For example, the ordering of the process steps may be varied in other embodiments, or certain steps may be performed concurrently with one another rather than serially.

It is to be appreciated that automated reliability prediction functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

In addition, as noted above, the configuration of information processing system 100 is exemplary only, and numerous other system configurations can be used in implementing a machine learning system as disclosed herein.

Figure 3:
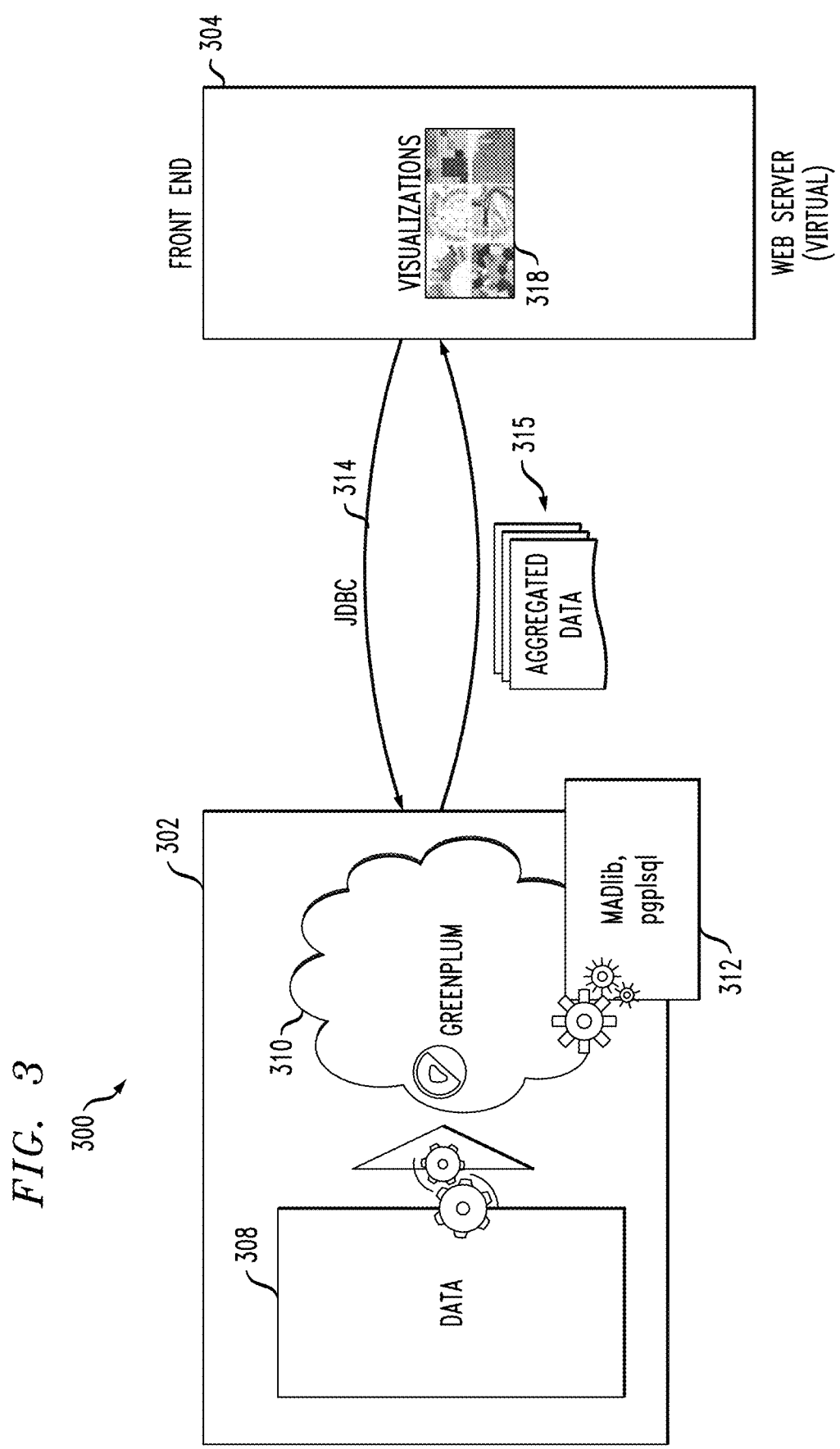
FIG. 3 shows another illustrative embodiment of an information processing system configured to include a machine learning system for automated generation of predicted reliability measures and associated early warning indicators for product and part combinations.

FIG. 3 shows another example of an information processing system 300 that implements a machine learning system in an illustrative embodiment. The system 300 comprises a data layer portion 302 and a front end portion 304. The data layer portion 302 comprises data 308 that is processed by an analytics system 310 illustratively implemented as a Greenplum® system. Additional functional elements 312 illustratively include a plurality of elements for implementing respective MADlib and pgplsql functionality. These elements interact with the analytics system 310 with input 314 from the front end portion 304. More particularly, front end portion 304 interacts with the analytics system 310 via Java DataBase Connectivity (JDBC) and receives sets of aggregated data 315 therefrom as illustrated.

The front end portion 304 comprises a web server illustratively implemented using one or more virtual machines and includes a user interface 318 providing visualizations of the type described elsewhere herein. The web server of the front end portion 304 communicates with the data layer portion 302 via JDBC as previously indicated.

The various portions of system 300 are adapted in the present embodiment to implement the functionality of a machine learning system similar to the machine learning system 104 as previously described.

The machine learning system in the FIG. 3 embodiment more particularly comprises a back end portion that corresponds to the data layer portion 302 and a front end portion that corresponds to the front end portion 304. In such an arrangement, the back end portion of the machine learning system comprises a big data analytics system, illustratively implemented as a massively parallel processing (MPP) database having an associated library of scalable in-database analytics functions. More particularly, the MPP database illustratively comprises the Greenplum® system 310 and its associated library of scalable in-database analytics functions is provided by MADlib element 312. These elements are utilized to implement at least a portion of the machine learning functionality of the machine learning system. The front end portion of the machine learning system interacts with the big data analytics system of the back end portion via a standardized database connectivity protocol, such as the above-noted JDBC protocol. As indicated previously, the front end portion illustratively comprises a web server implemented utilizing at least one virtual machine.

Again, this particular system configuration is only an example, and numerous other arrangements of system components can be used to provide that functionality. Also, other machine learning systems disclosed herein can be implemented using front end and back end portions configured as illustrated in FIG. 3.

As indicated previously, an example of a visualization generated by the visualization interface 126 in an illustrative embodiment will now be described with reference to FIG. 4, which shows an exemplary visualization 400 generated by the machine learning system 104. The visualization 400 is assumed to be one of a plurality of different user interface displays that are generated by the machine learning system 104. As shown in the figure, the visualization 400 more particularly comprises a quadrant plot view visualization of disk drives in the field for a particular time period as a function of predicted ARR.

The visualization 400 of FIG. 4 more particularly utilizes the ARR+6 months predicted reliability measure, which is just one example of a particular type of predicted reliability measure that can be computed by the reliability predictor 124 of the machine learning system 104 in an illustrative embodiment. Numerous other sets of predicted reliability measures and associated computation techniques can be used in other embodiments. For example, different prediction time periods can be used in other embodiments.

The visualization 400 plots the number of disk drives in the field on the vertical axis as a function of the ARR+6 months on the horizontal dimension.

Each small open circle is a plotted point corresponding to a different product and part combination. Variation in coloring or shading of the plotted points may be introduced with increasing predicted ARR, such that points falling within common quadrants exhibit a common coloring or shading.

Additionally or alternatively, different colors or shadings can be used to indicate relationships between different products. For example, a particular color can be used to indicate a particular disk drive type installed in a number of different products. Such an arrangement can help a user to identify if the predicted ARR is due to the disk drive or to the product. For example, some products may cause disk drives to reach the end of their useful lives much more quickly than other products.

It should be noted in this regard that the term "quadrant plot" as used herein is intended to be generally construed, and does not require that a plot be separated into any particular number of areas. Accordingly, a plot such as that shown in FIG. 4 in which different coloring or shading is associated with points falling into different areas within the plot is assumed to be a type of quadrant plot as that term is broadly used herein.

The user interface display comprising visualization 400 is configured to support drill down functionality into each of the plotted points corresponding to respective product and part combinations. For example, a pop-up data window 402 is presented upon selection of a particular plotted point 404.

This data window 402 presents the current ARR and predicted ARR for the selected point, both shown highlighted in respective boxes, as well as additional information associated with that point, such as one or more of parent name, product name, change rate, nominal change, number of drives in field, smoothed six month replacement rate, twelve month replacement rate, and mean days to replacement smoothed. The "parent name" in this example refers to a particular corporate entity name for the particular product at issue, and CI(FR) denotes the confidence interval for the failure rate or ARR.

The data window 402 also provides functionality for allowing a user to exclude all points corresponding to the same product that is the subject of the selected point, or to keep only the points that correspond to the same product that is the subject of the selected point.

Additionally or alternatively, different visual cues can be used to identify those product and part combinations having predicted reliability measures that are associated with early warning indicators 134. For example, particular shadings or colors can be used to highlight such product and part combinations. Additional text or other types of visual cues may also be used to convey the early warning indicators within the visualization 400, although such indicators are not explicitly shown in FIG. 4. As mentioned above, it is also possible for the early warning indicators to be conveyed to a user outside of the visualization, such as through alarms, messages or other alerting mechanisms.

The exemplary user interface display of FIG. 4 provides an ability to quickly drill down into the details of specific product and part combinations of interest even though the features on which the displays are based are aggregated from a big data repository potentially containing billions of distinct records. Such arrangements can also be used to generate reports focused on a specific customer base by product name. Additional dimensions can be added to the visualizations and utilized for filtering purposes.

The visualization 400 may be part of a business intelligence (BI) dashboard used to analyze product lines of a business or other enterprise. By plotting predicted reliability measures on one axis and number of parts on the other, the largest potential risks to the enterprise can be easily identified and prioritized.

It should be understood that the particular user interface display illustrated in FIG. 4 is presented by way of example only, and should not be construed as limiting the scope or functionality of the machine learning system 104 in any way.

Figure 5:
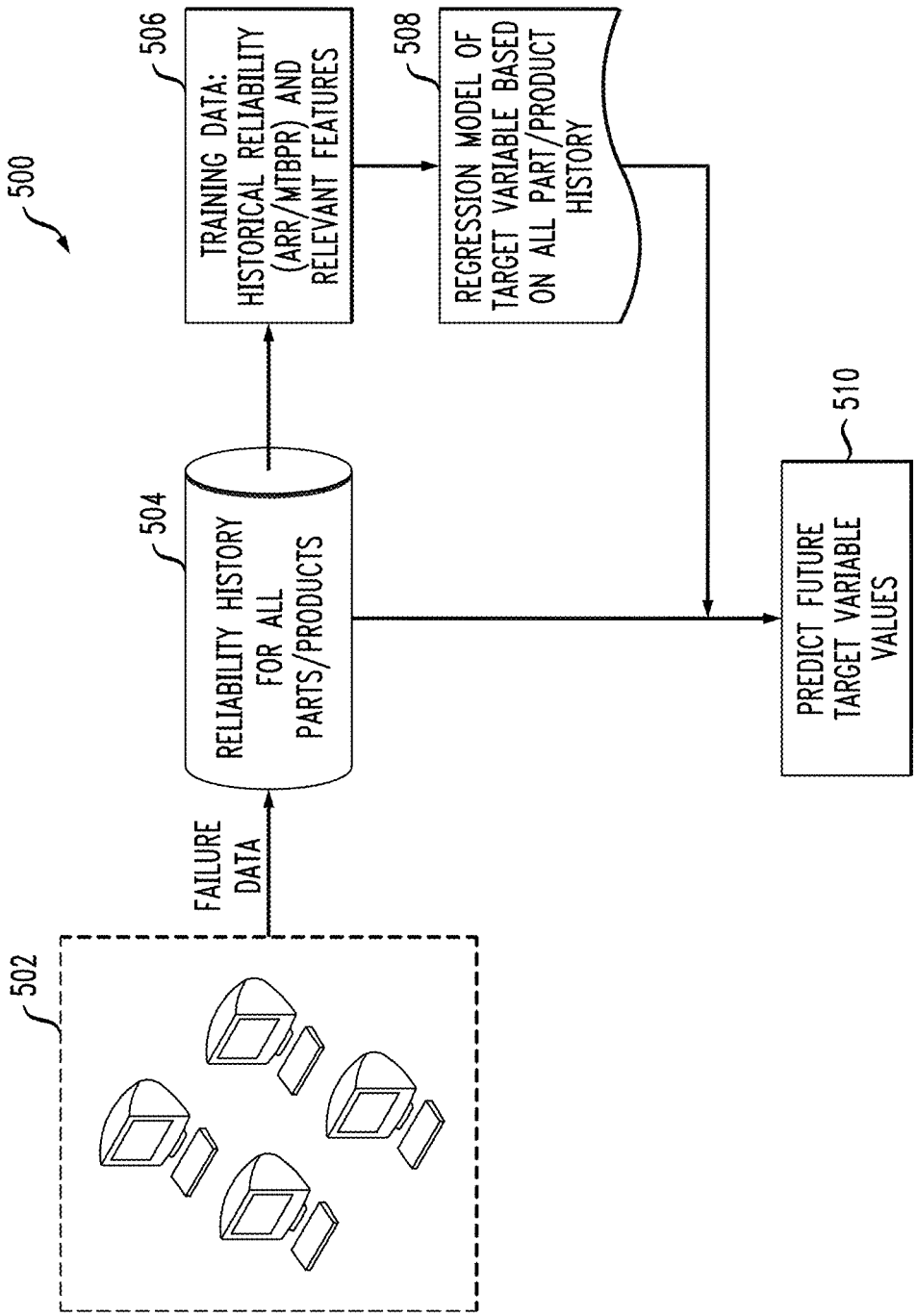
FIG. 5 shows a further illustrative embodiment of an information processing system configured to include a machine learning system for automated generation of predicted reliability measures and associated early warning indicators for product and part combinations.

FIG. 5 shows a machine learning system 500 in another illustrative embodiment. In this embodiment, a plurality of servers 502 provide failure data to a big data repository 504 that stores reliability history for all parts/products of one or more product lines of a business or other enterprise. Portions of this product and part data are utilized as training data 506 to train a regression model 508 in order to generate a reliability prediction 510. The training data 506 includes historical reliability data from the big data repository 504 for identified features such as ARR, MTBPR and other relevant features. The regression model 508 models one or more target variables such as ARR using the identified features and all associated part/product history from the big data repository 504. The reliability prediction 510 predicts future values for the one or more target variables.

The machine learning functionality of the machine learning system 500 including functionality associated with elements 506, 508 and 510 can be implemented at least in part using a big data analytics system comprising an MPP database having an associated library of scalable in-database analytics functions. Such a big data analytics system may comprise, for example, a Greenplum® system having an associated MADlib element, as previously described in conjunction with the FIG. 3 embodiment. In such an arrangement, the supervised learning takes place at least in part within the analytics system, although numerous alternative machine learning arrangements could be used in other embodiments.

A more detailed example of a shared model utilized in regression model 508 of the FIG. 5 embodiment will now be described. In this example, the shared model utilizes a set of four features, namely, current ARR, smoothed change in ARR ("smoothed ARR trend"), smoothed MTBPR and CI of the current ARR.

These four features of the shared model are illustratively computed as follows:
1. Current ARR: 365*# failures/# days_in_field
2. Smoothed ARR Trend:

$$\sum \frac{FR(\text{year})}{FR(6_{month})} * 0.7 + \frac{FR(\text{year})}{FR(9 \text{ month})} * 0.3$$

3. Smoothed MTBPR: # total_days_in_field_of_failed_drives/# failures
4. CI of ARR: $CI=1.96*\sqrt{ARR \times (1-ARR)/\text{drives\_in\_field}}$ The ARR trend and MTBPR are smoothed in order to reduce noise that might otherwise arise in cases of small sample sizes. This may illustratively involve a Bayesian process of adding pseudo counts. For example, if there are 5000 disk drives of a particular type installed in a certain product, and during the entire year none of them failed, the model would predict that these drives never fail. Instead, a small fake count or "pseudo count" of failed drives is added to each of the actual failed drive counts, to reflect the fact that it is highly unlikely given a large number of drives that none of them would fail. For example, a pseudo count of 5 or 10 failed drives could be added to every failed drive count. Thus if a particular failed drive count indicates that 10,000 drives of the particular type failed, the count would be increased by 5 or 10. A similar approach is utilized to smooth MTBPR. For example, if in the above-noted set of 5000 disk drives of the particular type, only a single drive actually failed, but it failed on the day of install (i.e., age=1 day), the model might predict that the drives are failing early. Instead, a pseudo count of 5 or 10 drives is added to the failed drive total with each such failure occurring at what would be considered a normal age (e.g., age=2,000 days). Such smoothing arrangements can take into account prior knowledge regarding product and part combinations in order to improve the predictive performance of the shared model.

It may also be desirable to normalize certain values. For example, ARR values can be normalized using a boxplot or other suitable techniques. The following norm_fr function can be used to normalize failure rate or ARR between a maximum value of 5% and a minimum value of 0.2%: norm_fr: (max(min([Failure Rate]*100,5)–0.2,0))/5, with the minimum and maximum values being determined from the boxplot.

Numerous alternative techniques can be used for smoothing and/or normalization of identified features in conjunction with implementation of a shared model.

The above-described four features (i.e., current ARR, smoothed ARR trend, smoothed MTBPR, and CI of current ARR) are combined into the shared model for computing predicted ARR. This illustratively involves, for example, collecting historical values of the four features for each of a plurality of product and part combinations from a particular point in time in the prior year. The target variable of the shared model is future ARR, and more particularly the previously-described ARR+6 month predicted reliability measure, indicating the predicted ARR at a point in time six months from the current time corresponding to the current ARR.

Accordingly, if the model is being trained in August 2015, the August 2015 value for current ARR is used as the target variable and the feature values are the respective historical values of the four features from six months prior, or in February 2015. The features are combined into the shared model using regression model training, possibly implemented using the above-noted Greenplum® system having an associated MADlib element. Other regression techniques can be used, such as regression implemented using a Python machine learning kit.

As mentioned previously, the system embodiments of FIGS. 1, 3 and 5 are presented by way of example only. Numerous other configurations and arrangements of components can be used to implement a machine learning system with reliability prediction functionality for product and part combinations as disclosed herein.

The illustrative embodiments provide a number of significant advantages relative to conventional arrangements. For example, these embodiments provide particularly efficient processing of data relating to product and part combinations. User interface displays such as those providing a quadrant plot view visualization of the type illustrated in FIG. 4 provide detailed insights into reliability issues associated with product and part combinations. Such insights would not otherwise be apparent using conventional approaches.

Machine learning systems in some embodiments are advantageously configured to provide accurate and efficient analysis of high-dimensionality data including many thousands of different product and part combinations. Moreover, these systems can effectively provide early detection of reliability issues even for sparse data.

A given machine learning system configured as disclosed herein can provide a strong early detection capability not otherwise available for prediction of reliability issues that may arise in particular product and part combinations. For example, such a system can be configured to provide early warning indicators for respective product and part combinations for which predicted reliability measures such as predicted ARR exceed specified thresholds.

Such a machine learning system can be configured to provide an efficient and simple to use dashboard for business intelligence. An arrangement of this type can maximize the impact of analysis resources and minimize reliability issue costs to the organization, while also enhancing total customer experience for one or more product lines.

The regression-based shared model utilized in illustrative embodiments is simple and efficient, providing a high level of accuracy and a low rate of false positives in generating reliability predictions, even in the cases of high-dimensionality data and sparse data. In some embodiments, the shared model is generated over a non-homogeneous population of parts utilizable in one or more products.

It is to be appreciated that the foregoing advantages are illustrative of advantages provided in certain embodiments, and need not be present in other embodiments.

It was noted above that portions of the information processing system 100 may be implemented using one or more processing platforms. A given such processing platform comprises at least one processing device comprising a processor coupled to a memory, and the processing device may be implemented at least in part utilizing one or more virtual machines, containers or other virtualization infrastructure.

Illustrative embodiments of such platforms will now be described in greater detail. Although described in the context of system 100, these processing platforms may also be used to implement at least portions of other information processing systems in other embodiments of the invention, such as the information processing systems 300 and 500 of FIGS. 3 and 5.

Figure 6:
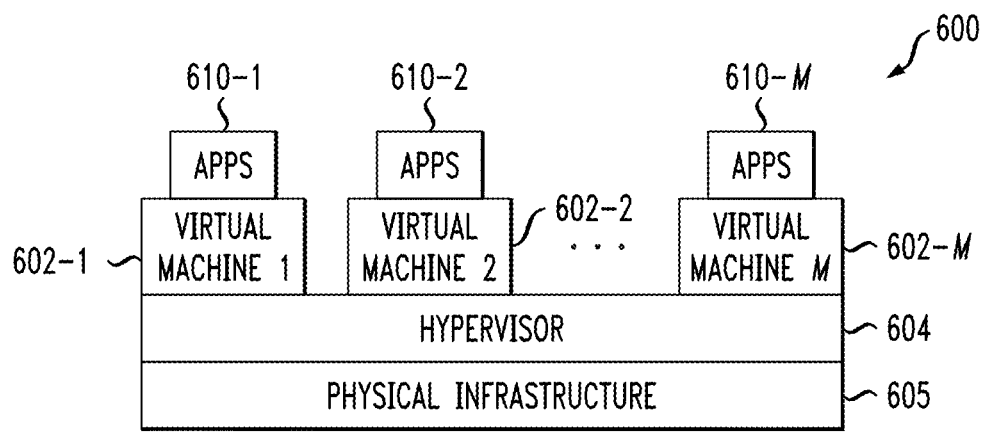
FIGS. 6 and 7 show examples of processing platforms that may be utilized to implement at least a portion of one or more of the information processing systems of FIGS. 1, 3 and 5.

As shown in FIG. 6, portions of the information processing system 100 may comprise cloud infrastructure 600. The cloud infrastructure 600 comprises virtual machines (VMs) 602-1, 602-2, . . . 602-M implemented using a hypervisor 604. The hypervisor 604 runs on physical infrastructure 605. The cloud infrastructure 600 further comprises sets of applications 610-1, 610-2, . . . 610-M running on respective ones of the virtual machines 602-1, 602-2, . . . 602-M under the control of the hypervisor 604.

Although only a single hypervisor 604 is shown in the embodiment of FIG. 6, the system 100 may of course include multiple hypervisors each providing a set of virtual machines using at least one underlying physical machine. For example, different sets of virtual machines provided by respective ones of multiple hypervisors may be utilized in configuring multiple instances of one or more of data aggregation module 120, predictive model generator 122, reliability predictor 124, visualization interface 126 or other components of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system 100.

The cloud infrastructure 600 in FIG. 6 can additionally or alternatively be implemented using other types of virtualization techniques, such as Docker containers or other types of containers.

Figure 7:
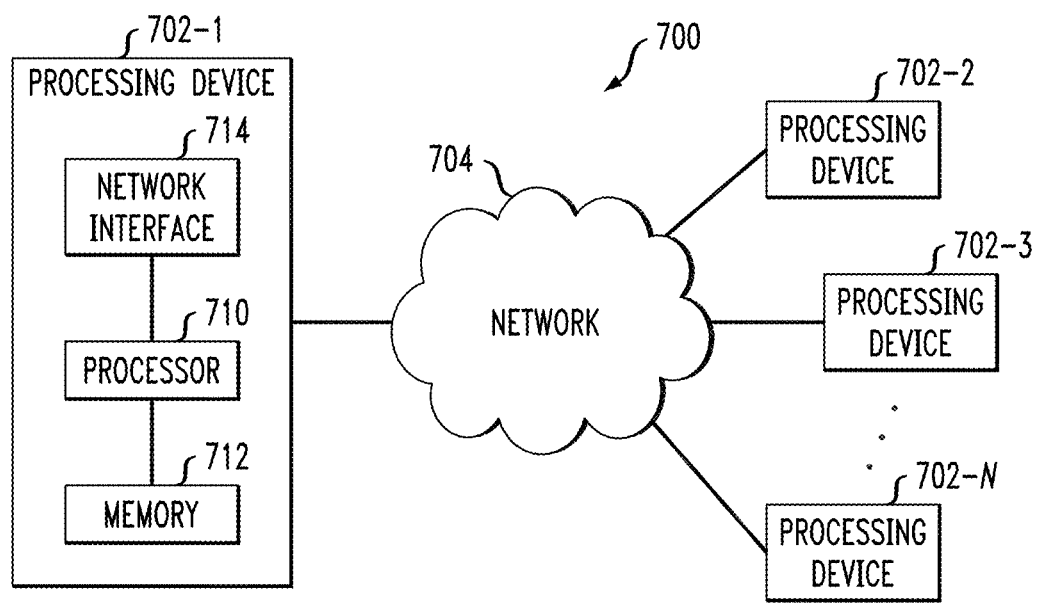

Another example of a processing platform suitable for use in some embodiments is processing platform 700 shown in FIG. 7. The processing platform 700 in this embodiment is assumed to comprise at least a portion of system 100 and includes a plurality of processing devices, denoted 702-1, 702-2, 702-3, . . . 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an ASIC, an FPGA, or other type of processing circuitry, as well as portions or combinations of such circuitry elements.

The memory 712 may comprise RAM, ROM or other types of memory, in any combination. As mentioned previously, the memory 712 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
    a processing platform configured to implement a machine learning system for automated generation of predicted reliability measures and associated early warning indicators for product and part combinations;
    wherein the machine learning system comprises:
    a data aggregation module configured to extract product and part data from a data repository; and
    a reliability predictor coupled to the data aggregation module and configured to generate predicted reliability measures for respective ones of the product and part combinations utilizing a shared model that is determined based at least in part on the extracted product and part data;
    the predicted reliability measures comprising at least a first predicted reliability measure for a first part implemented in a first product that includes the first part and one or more additional parts, and a second predicted reliability measure, different than the first predicted reliability measure, for the first part implemented in a second product different than the first product, the second product including the first part and one or more additional parts different than the one or more additional parts of the first product;
    the first and second predicted reliability measures being configured to permit detection of product-induced variation in reliability of the first part;
    the machine learning system processing the predicted reliability measures to generate early warning indicators relating to particular ones of the product and part combinations having predicted reliability measures that fail to meet one or more specified criteria;
    the machine learning system providing the early warning indicators to a visualization interface so as to permit a user to adjust a product line to avoid potentially problematic product and part combinations;
    wherein the shared model is updated under the control of the machine learning system to take into account changes in the product and part data in the data repository;
    wherein the processing platform is further configured to generate for presentation in the visualization interface a quadrant plot view visualization that displays the predicted reliability measures for respective product and part combinations as a function of number of parts in field for a designated time period, with each of a plurality of points plotted in the quadrant plot view visualization corresponding to a different one of the product and part combinations; and
    wherein the processing platform comprises one or more processing devices each comprising a processor coupled to a memory.

2. The apparatus of claim 1 wherein the machine learning system comprises:
    a back end portion; and
    a front end portion coupled to the back end portion;
    the back end portion comprising a data analytics system implementing machine learning functionality of the machine learning system including at least part of one or more of the data aggregation module and the reliability predictor;
    the front end portion implementing at least part of the visualization interface.

3. The apparatus of claim 2 wherein the data analytics system of the back end portion comprises a parallel processing database having an associated library of scalable in-database analytics functions.

4. The apparatus of claim 2 wherein the front end portion interacts with the data analytics system of the back end portion via a standardized database connectivity protocol.

5. The apparatus of claim 2 wherein the front end portion comprises a web server implemented utilizing at least one virtual machine.

6. The apparatus of claim 1 wherein the machine learning system further comprises a predictive model generator configured to identify a plurality of features relevant to the extracted product and part data, to construct the shared model as a regression model over multiple ones of the product and part combinations based on the identified features, and to train the shared model utilizing at least a portion of the extracted product and part data.

7. The apparatus of claim 6 wherein the identified features comprise at least a subset of current replacement rate, change in replacement rate, mean time between replacement and confidence interval of current replacement rate.

8. The apparatus of claim 7 wherein the current replacement rate comprises a current annual replacement rate and the change in replacement rate comprises a smoothed change in replacement rate.

9. The apparatus of claim 7 wherein the confidence interval of the current replacement rate is determined as a function of the current replacement rate and number of parts in field for a designated time period.

10. The apparatus of claim 1 wherein the shared model comprises different models for different part types.

11. The apparatus of claim 1 wherein the shared model is generated for a particular product and encompasses a plurality of different parts of a particular part type that are usable in the particular product.

12. An information processing system comprising the apparatus of claim 1.

13. A method comprising steps of:
extracting product and part data from a data repository;
generating predicted reliability measures for respective product and part combinations utilizing a shared model that is determined based at least in part on the extracted product and part data;
the predicted reliability measures comprising at least a first predicted reliability measure for a first part implemented in a first product that includes the first part and one or more additional parts, and a second predicted reliability measure, different than the first predicted reliability measure, for the first part implemented in a second product different than the first product, the second product including the first part and one or more additional parts different than the one or more additional parts of the first product;
the first and second predicted reliability measures being configured to permit detection of product-induced variation in reliability of the first part;
processing the predicted reliability measures to generate early warning indicators relating to particular ones of the product and part combinations having predicted reliability measures that fail to meet one or more specified criteria;
providing the early warning indicators to a visualization interface so as to permit a user to adjust a product line to avoid potentially problematic product and part combinations;
generating for presentation in the visualization interface a quadrant plot view visualization that displays the predicted reliability measures for respective product and part combinations as a function of number of parts in field for a designated time period, with each of a plurality of points plotted in the quadrant plot view visualization corresponding to a different one of the product and part combinations; and
updating the shared model to take into account changes in the product and part data in the data repository;
wherein said steps are performed by a processing platform comprising one or more processing devices.

14. The method of claim 13 further comprising:
identifying a plurality of features relevant to the extracted product and part data;
constructing the shared model over multiple product and part combinations based on the identified features; and
training the shared model utilizing at least a portion of the extracted product and part data.

15. The method of claim 14 wherein the identified features comprise at least a subset of current replacement rate, change in replacement rate, mean time between replacement and confidence interval of current replacement rate.

16. A non-transitory processor-readable storage medium having program code of one or more software programs embodied therein, wherein the program code when executed by at least one processing device of a processing platform causes the processing device:
to extract product and part data from a data repository;
to generate predicted reliability measures for respective product and part combinations utilizing a shared model that is determined based at least in part on the extracted product and part data;
the predicted reliability measures comprising at least a first predicted reliability measure for a first part implemented in a first product that includes the first part and one or more additional parts, and a second predicted reliability measure, different than the first predicted reliability measure, for the first part implemented in a second product different than the first product, the second product including the first part and one or more additional parts different than the one or more additional parts of the first product;
the first and second predicted reliability measures being configured to permit detection of product-induced variation in reliability of the first part;
to process the predicted reliability measures to generate early warning indicators relating to particular ones of the product and part combinations having predicted reliability measures that fail to meet one or more specified criteria;
to provide the early warning indicators to a visualization interface so as to permit a user to adjust a product line to avoid potentially problematic product and part combinations;
to generate for presentation in the visualization interface a quadrant plot view visualization that displays the predicted reliability measures for respective product and part combinations as a function of number of parts in field for a designated time period, with each of a plurality of points plotted in the quadrant plot view visualization corresponding to a different one of the product and part combinations; and
to update the shared model to take into account changes in the product and part data in the data repository.

17. The non-transitory processor-readable storage medium of claim 16 wherein the program code when executed by at least one processing device further causes said processing device:
    to identify a plurality of features relevant to the extracted product and part data;
    to construct a shared model over multiple product and part combinations based on the identified features; and
    to train the shared model utilizing at least a portion of the extracted product and part data.

18. The non-transitory processor-readable storage medium of claim 17 wherein the identified features comprise at least a subset of current replacement rate, change in replacement rate, mean time between replacement and confidence interval of current replacement rate.

19. The non-transitory processor-readable storage medium of claim 18 wherein the current replacement rate comprises a current annual replacement rate and the change in replacement rate comprises a smoothed change in replacement rate.

20. The non-transitory processor-readable storage medium of claim 18 wherein the confidence interval of the current replacement rate is determined as a function of the current replacement rate and number of parts in field for a designated time period.

\* \* \* \* \*